United States Patent
Jawaharlal et al.

(10) Patent No.: US 9,967,221 B2
(45) Date of Patent: May 8, 2018

(54) RETAINING A SINGLE THREAD AFTER INSERTION OF A NEW E-MAIL

(71) Applicant: INTERNATIONAL BUSINESS MACHINES CORPORATION, Armonk, NY (US)

(72) Inventors: Samuel Mathew Jawaharlal, Chennai (IN); Bala Priyadarshini Muralidharan, Bangalore (IN); Arunachalam Narayanan, Chennai (IN); Sathya Santhar, Chennai (IN); Balamurugaramanathan Sivaramalingam, Ramanathapuram (IN)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 14/860,746

(22) Filed: Sep. 22, 2015

(65) Prior Publication Data
US 2017/0085510 A1    Mar. 23, 2017

(51) Int. Cl.
*G06F 15/16* (2006.01)
*H04L 12/58* (2006.01)

(52) U.S. Cl.
CPC .............. *H04L 51/16* (2013.01); *H04L 51/28* (2013.01)

(58) Field of Classification Search
CPC ................................ H04L 51/16; H04L 51/28
See application file for complete search history.

(56) References Cited

U.S. PATENT DOCUMENTS

| | | | |
|---|---|---|---|
| 6,823,368 B1 | 11/2004 | Ullman et al. | |
| 7,516,186 B1 | 4/2009 | Borghetti et al. | |
| 7,895,279 B2 | 2/2011 | Forstall et al. | |
| 8,010,613 B2 | 8/2011 | Oral et al. | |
| 8,898,240 B2 | 11/2014 | Wideman | |
| 2001/0027446 A1* | 10/2001 | Metcalfe | G06Q 10/06311 705/67 |
| 2007/0094605 A1* | 4/2007 | Dietz | H04L 51/066 709/206 |

(Continued)

OTHER PUBLICATIONS

B. Kerr, "Thread Arcs: An Email Thread Visualization", IEEE, IEEE Symposium on Information Visualization, 2003, pp. 1-8.

(Continued)

*Primary Examiner* — Richard G Keehn
(74) *Attorney, Agent, or Firm* — John R. Pivnichny; Law Office of Jim Boice (57) ABSTRACT

A computer-implemented method, system, and/or computer program product inserts a new e-mail into an interior of an original e-mail thread. An e-mail server receives a request to send a new e-mail to a new recipient. The new e-mail is relevant to an interior e-mail in an original e-mail thread. The original e-mail thread is an existing e-mail thread that has an unbranched single thread status, and includes an initial e-mail and a latest e-mail that are addressed to prior recipients. The interior e-mail is chronologically between the initial e-mail and the latest e-mail in the original e-mail thread. The e-mail server retrieves the original e-mail thread and inserts the new e-mail into the original e-mail thread next to the interior e-mail to create an updated e-mail thread, such that the updated e-mail thread retains the unbranched single thread status of the original e-mail thread.

17 Claims, 3 Drawing Sheets

(56) References Cited

U.S. PATENT DOCUMENTS

| | | | |
|---|---|---|---|
| 2007/0112930 A1* | 5/2007 | Foo | H04L 51/08 709/214 |
| 2008/0098072 A1 | 4/2008 | Jones et al. | |
| 2008/0294727 A1 | 11/2008 | Moody et al. | |
| 2010/0088377 A1 | 4/2010 | Johnson et al. | |
| 2011/0191429 A1 | 8/2011 | Tu et al. | |
| 2012/0304079 A1* | 11/2012 | Rideout | H04L 12/1818 715/758 |
| 2015/0089400 A1 | 3/2015 | Staats | |

OTHER PUBLICATIONS

A. Pash, "Gmail Lets You Unthread Your Email for a More Traditional Conversation View", www.lifehacker.com, Sep. 29, 2010, pp. 1-7.

Anonymous, "Thread: Conditional Branching and mail sending", Pentaho Corporation, forums.pentaho.com, Nov. 19, 2013, pp. 1-6.

* cited by examiner

RETAINING A SINGLE THREAD AFTER INSERTION OF A NEW E-MAIL

BACKGROUND

The present disclosure relates to the field of computers, and specifically to computers that manage e-mail. More specifically, the present disclosure relates to e-mail servers that manage e-mail threads.

SUMMARY

A computer-implemented method, system, and/or computer program product inserts a new e-mail into an interior of an original e-mail thread. An e-mail server receives a request to send a new e-mail to a new recipient. The new e-mail is relevant to an interior e-mail in an original e-mail thread. The original e-mail thread is an existing e-mail thread that has an unbranched single thread status. The original e-mail thread includes an initial e-mail and a latest e-mail, and the interior e-mail is chronologically between the initial e-mail and the latest e-mail in the original e-mail thread. The initial e-mail and the latest e-mail are addressed to prior recipients. The e-mail server then retrieves the original e-mail thread, and inserts the new e-mail into the original e-mail thread to create an updated e-mail thread, such that the new e-mail is inserted next to the interior e-mail in the original e-mail thread. The updated e-mail thread retains the unbranched single thread status of the original e-mail thread. The e-mail server provides the updated e-mail thread to the prior recipients, such that the updated e-mail thread displays the new e-mail and an identity of the new recipient of the new e-mail. The e-mail server also provides all e-mails from the original e-mail thread and identities of the prior recipients to the new recipient.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
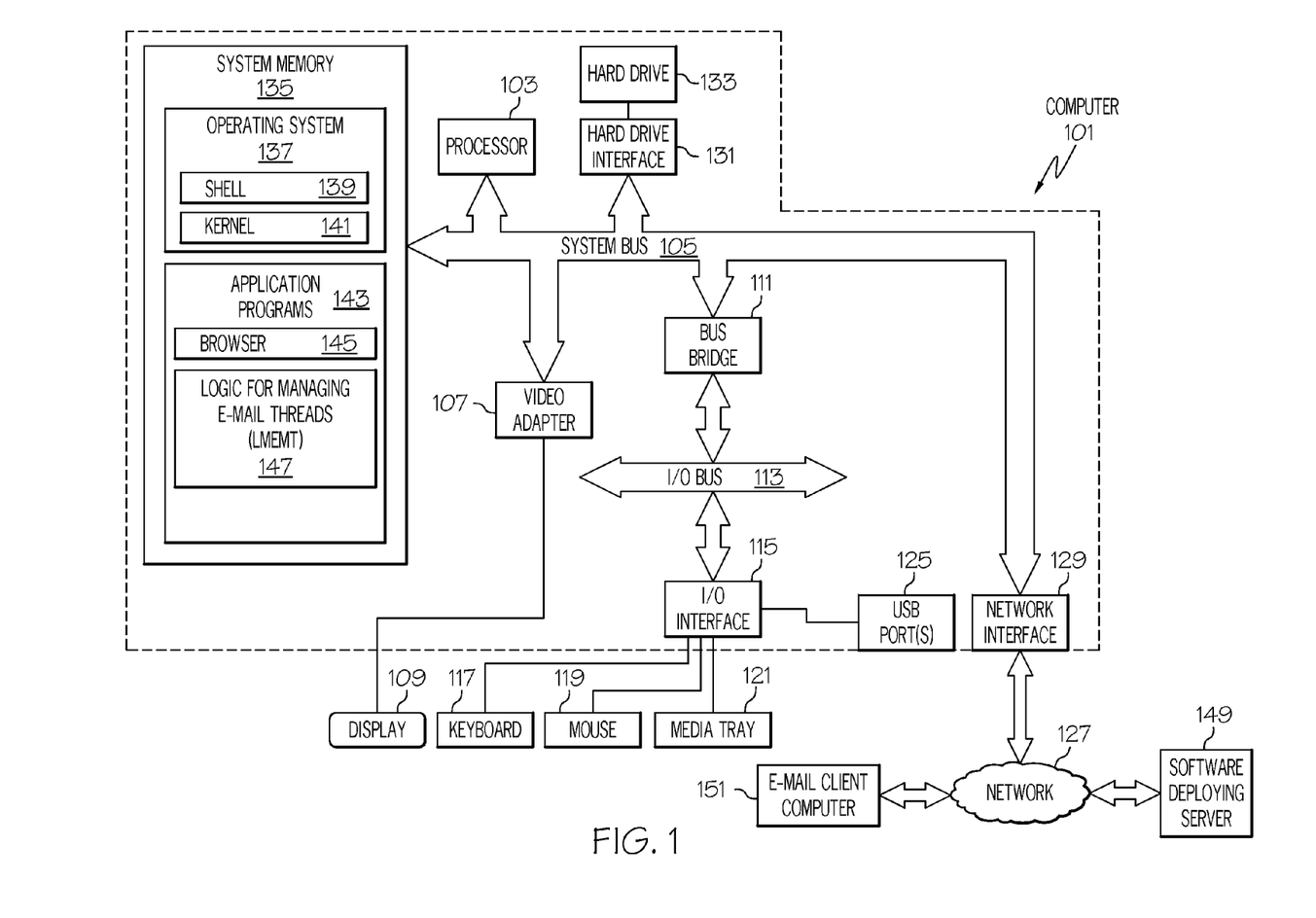
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or e-mail client computers 151 shown in FIG. 1.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems (e.g., e-mail client computers 151) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Managing E-mail Threads (LMEMT) 147. LMEMT 147 includes code for implementing the processes described below, including those described in FIGS. 2-3. In one embodiment, computer 101 is able to download LMEMT 147 from software deploying server 149, including in an on-demand basis, wherein the code in LMEMT 147 is not downloaded until needed for execution. In one embodiment of the present invention, software deploying server 149 performs all of the functions associated with the present invention (including execution of LMEMT 147), thus freeing computer 101 from having to use its own internal computing resources to execute LMEMT 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Both for inter-organization and intra-organization communications, there are often e-mails sent out in bulk form, thus addressing multiple recipients and continuing as e-mail threads (also known as "chains" or "conversations"). That is, an e-mail thread is made up of multiple e-mails, where each subsequent e-mail is responsive to an earlier e-mail in the e-mail thread.

There is a possibility of branching out from an e-mail thread for various reasons. For example, a customer may wish to share information from the e-mail thread with a vendor by sending an e-mail (from the e-mail thread) to the vendor. Doing so, however, results in a fork in the e-mail thread, such that there are now two e-mail threads (the original thread and the new thread created by the fork). In this scenario, those e-mail users who participated in the original thread are unable to see the new thread. Furthermore, the new participant to the e-mail thread is only able to see e-mails that occurred since joining the newly-created e-mail thread (i.e., after the fork in the original e-mail thread), even if the customer did not mean to create a new thread when communicating with the vendor.

Furthermore, in the prior art a user is unable to then define rules that govern how the thread with the newly-added e-mail is handled (e.g., which e-mails from the thread are to be sent to the user).

As described herein, the present invention in one or more embodiments enables an e-mail user to insert a new e-mail into the middle of an e-mail thread without creating a new e-mail thread (i.e., such that a fork in the e-mail thread creates two separate threads/paths). By maintaining the single thread nature of the original e-mail thread, the present invention 1) allows participants in the original existing e-mail thread to see the new e-mail that has been inserted into the original e-mail thread, and 2) allows the recipient of the new e-mail to see the rest of the original e-mail thread and/or the identities of the participants in the original existing e-mail thread.

As further described herein, the present invention in one or more embodiments enables a user of an e-mail thread to write rules at the individual mail level through a notification to the e-mail server (rather than at the e-mail client level). For example, assume that User A does not want to receive any of the mails in the mail thread unless there is a reply from specific recipients of a specific e-mail (e.g., the third and fifth e-mails from the e-mail thread), or that User A does not want to receive any reply e-mails responsive to the fourth e-mail from the e-mail thread. The present invention allows User A to direct the e-mail server accordingly.

Figure 2:
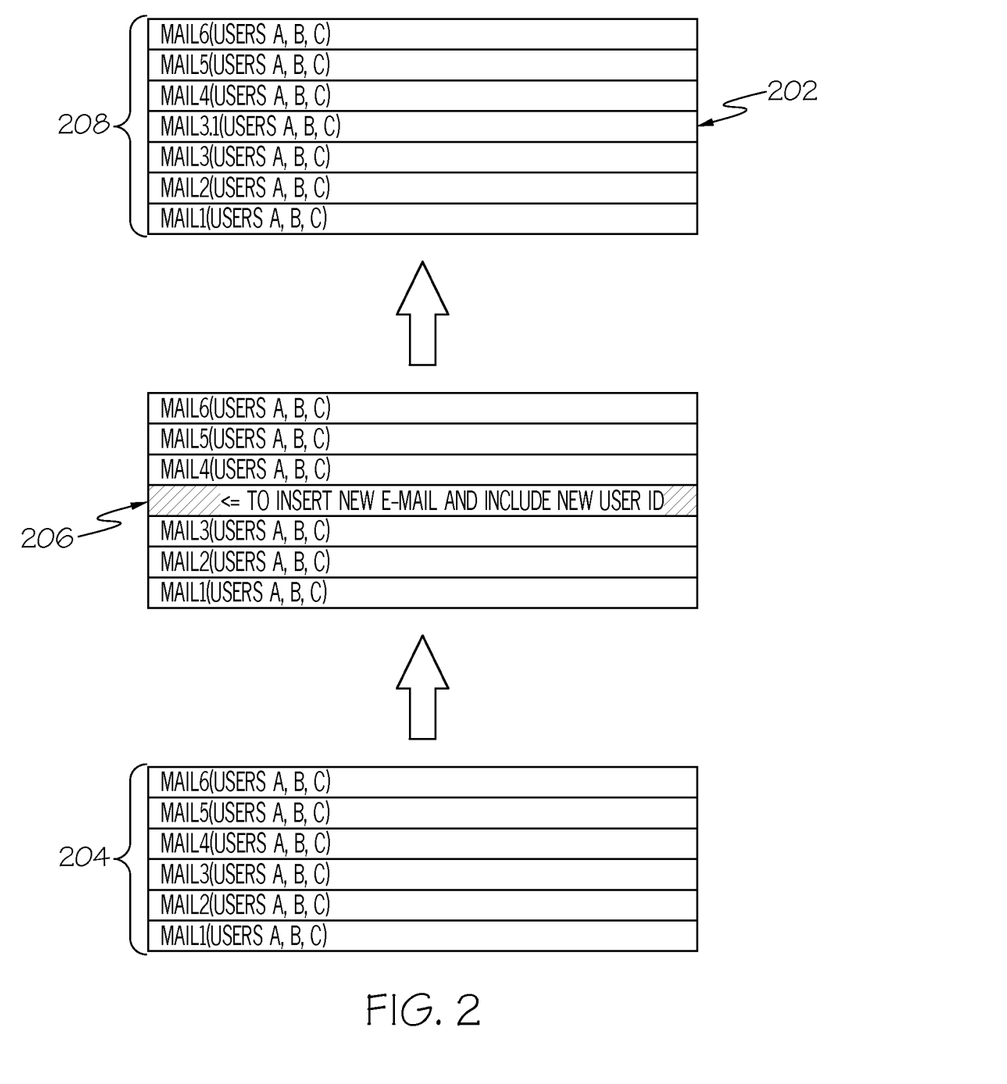
FIG. 2 illustrates a new e-mail being inserted into an existing original e-mail thread in accordance with one or more embodiments of the present invention.

With reference now to FIG. 2, assume that a user wants to insert a new e-mail 202 into an original (i.e., existing) e-mail thread 204. Assume that Mail1 is the oldest (initial) e-mail in the original e-mail thread 204, and Mail6 is the most recent (latest) e-mail in the original e-mail thread 204. Assume also that the new e-mail 202 is relevant to Mail3 shown in the original e-mail thread 204. For example, Mail3 may be about Product D, which is sold by Vendor D (User D). User A may wish to share Mail3, along with the an additional message from User A, to Vendor D, as a new Mail3.1 (new e-mail 202).

As shown in FIG. 2, Mail3.1 (new e-mail 202) is inserted next to Mail3, since it is related to (relevant to) the content found in Mail3. This is accomplished by dragging instruction box 206 onto a representation of the e-mail thread 204. This dragging operation 1) causes a space to open up above Mail3, and 2) insert the new Mail3.1 into the original e-mail thread, thus creating the updated e-mail thread 208.

As depicted in FIG. 2, the identity and/or e-mail addresses of User A, User B, User C, and User D are shown in the header of Mail3.1. Similarly, the identity and/or e-mail addresses of User A, User B, and User C are shown in the headers of Mail1-Mail6 (as shown in the original e-mail thread 204). Thus, User D is able to see Mail1-Mail6, and/or Users A-C are able to see Mail3.1, since there is no branching/fork in the original e-mail thread 204.

In one embodiment, whenever an e-mail is replied to or forwarded (i.e., Mail3.1 (new e-mail 202) is inserted into the original e-mail thread 204), the e-mail server (e.g., computer 101 shown in FIG. 1) recreates the original e-mail thread 204, complete with the identifiers of the e-mails (e.g., Mail1-Mail6 shown in FIG. 2) as well as the identities of the participants (sender and/or recipients) of the e-mails (e.g., Users A-C).

Whenever a user tries to reply to an e-mail in the middle of the e-mail thread 204 (e.g., between Mail3 and Mail 4), the new e-mail identifier (e.g., Mail3.1) is inserted in the header of a descriptor of the e-mail thread (now updated e-mail thread 208), showing Mail1, Mail2, Mail3, Mail3.1, Mail4, Mail5, and Mail6), where the titles Mail1, Mail2, Mail3, Mail4, Mail5, and Mail6 indicate that these are the e-mails from the original e-mail thread 204, and the title Mail3.1 indicates (due to the presence of the period found in Mail3.1) that this is a newly inserted e-mail, thus creating the updated e-mail thread 208.

Notification is then sent from the e-mail server to Users A, B, and C that Mail3.1 has been inserted (e.g., using an alert e-mail, a popup alert pops up on a user interface on one or more of the e-mail client computers 151 shown in FIG. 1, etc.), and the corresponding headers are updated so that e-mail replies on top of the latest mail (Mail6) will also carry the inserted mail (Mail3.1). Furthermore, in one embodiment of the present invention, the inserted Mail3.1 is highlighted, thus showing that it was inserted into the original e-mail thread 204.

In one embodiment of the present invention, if any user deletes an e-mail (e.g., Mail2) from the updated e-mail thread 202, then a header of a message from the e-mail server is adjusted to reflect that Mail2 has been deleted from the updated e-mail thread 202.

Whenever a user wants to write a rule (rules instructions) for a specific mail in the e-mail thread, the mail thread is opened and rules are written in a rules section for a specific mail. That is, if a user of e-mail client computers 151 wants only replies of certain e-mails from the e-mail thread 208 to be sent to that user, be blocked to that user, etc., then that user can send a rules instruction describing the rule that represents the desire of that user.

In one embodiment of the present invention, the rule(s) may also be stored in the e-mail client (e.g., one or more of the e-mail client computers 151 shown in FIG. 1), as well as the e-mail server (e.g., computer 101 shown in FIG. 1).

Figure 3:
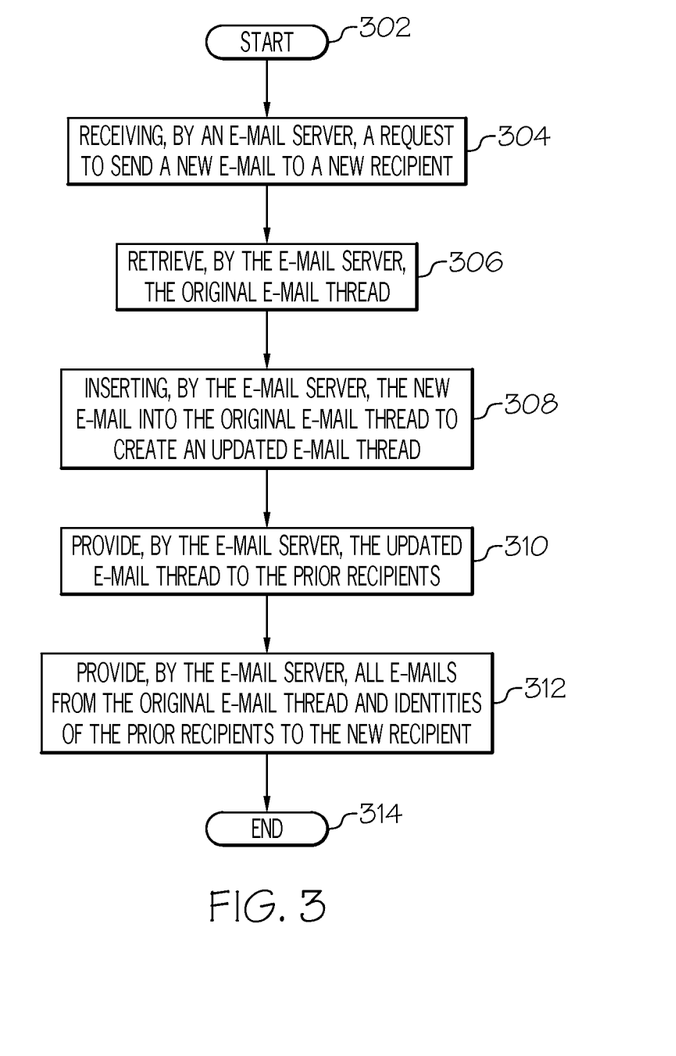
FIG. 3 is a high-level flow chart of one or more steps performed by one or more computing devices to insert a new e-mail into an original e-mail thread, in accordance with one or more embodiments of the present invention.

With reference now to FIG. 3, a flow-chart of one or more steps performed by one or more computer devices to insert a new e-mail into an interior of an original e-mail thread in accordance with one or more embodiments of the present invention is presented.

After initiator block 302 and as depicted in block 304, an e-mail server (e.g., computer 101 shown in FIG. 1) receives a request (e.g., from one of the e-mail client computers 151 shown in FIG. 1) to send a new e-mail (e.g., Mail3.1—e-mail 202 shown in FIG. 2) to a new recipient (e.g., User D, who is not part of the e-mail recipients in the original e-mail thread 204 shown in FIG. 2). The new-mail is relevant to an interior e-mail (e.g., Mail3) in an original e-mail thread (e.g., original e-mail thread 204). The original e-mail thread is an existing e-mail thread that has an unbranched single thread status. That is, all of the e-mails in the original e-mail thread are in linear order, such that there are no branches to sub-threads.

As shown in FIG. 2, the original e-mail thread 204 includes an initial e-mail (e.g., Mail1) and a latest e-mail (e.g., Mail6), and the interior e-mail (e.g., Mail3.1) is chronologically between the initial e-mail and the latest e-mail in the original e-mail thread. That is, Mail3 occurred after Mail1 but before Mail6 in FIG. 2. Furthermore, the initial e-mail and the latest e-mail are addressed to prior recipients (e.g., Users A-C).

As depicted in block 306, the e-mail server retrieves the original e-mail thread, in order to be able to modify it as described herein.

As depicted in block 308, the e-mail server then inserts the new e-mail (e.g., Mail3.1 shown in FIG. 2) into the original e-mail thread (e.g., original e-mail thread 204 shown in FIG. 2) to create an updated e-mail thread (e.g., updated e-mail thread 208 shown in FIG. 2). The new e-mail is inserted next to the interior e-mail in the original e-mail thread (e.g., Mail3.1 is inserted next to Mail3). Furthermore, the updated e-mail thread retains the unbranched single thread status of the original e-mail thread. That is, there is not a new branch or sub-branch coming off the original e-mail thread 204 when the updated e-mail thread 208 is created.

As described in block 310, the e-mail server then provides the updated e-mail thread to the prior recipients (A,B,C in FIG. 2). The updated e-mail thread displays the new e-mail (e.g., Mail3.1) and an identity of the new recipient (D) of the new e-mail, such that the prior recipients are able to see the identity (and/or e-mail address of) the new recipient.

As described in block 312, the e-mail server also provides all e-mails from the original e-mail thread (or at least a record thereof) as well as the identities of the prior recipients (A,B,C) to the new recipient (D).

The flow-chart ends at terminator block 314.

In an embodiment of the present invention, the e-mail server receives a rules instruction from a user who created the new e-mail. The rules instruction defines how to handle a future e-mail in the updated e-mail thread.

In one embodiment of the present invention, the rules instruction directs the e-mail server to block the user who created the new e-mail from receiving any future e-mails (not shown in FIG. 2), but which are associated with the updated e-mail thread (updated e-mail thread 208 shown in FIG. 2) unless the new recipient (D) responds to any of the e-mails in the updated e-mail thread 208.

In one embodiment of the present invention, the rules instruction directs the e-mail server to block the user who created the new e-mail from receiving the future e-mail in the updated e-mail thread unless one or more of the prior recipients (A,B,C) responds to any of the e-mails in the updated e-mail thread 208.

In one embodiment of the present invention, the rules instruction directs the e-mail server to block the recipient (D) of the new e-mail (Mail3.1) from receiving the future e-mail in the updated e-mail thread unless one or more of the prior recipients (A,B,C) responds to the new e-mail (Mail3.1).

In one embodiment of the present invention, the rules instruction directs the e-mail server to, in response to the new recipient (D) sending a response to an e-mail (any of the e-mails Mail1-Mail6 and/or Mail3.1) from the updated e-mail thread that violates the rules instruction, blocking the response to the e-mail from the updated e-mail thread. That is, the new recipient (D) is prohibited from further participating in the updated e-mail thread.

In one embodiment of the present invention, the rules instruction directs the e-mail server to transmit a notice of the rules instruction to the new recipient. For example, if the new recipient (D) attempts to respond to an e-mail from the updated e-mail thread, a pop-up message may appear on his/her computer screen, informing him/her that he/she is not permitted to reply to any of the e-mails in the updated e-mail thread.

The present invention provides several advantages over the prior art.

For example, as described herein, the present invention enables any user in the mail thread to write rules at the individual mail level in the mail thread instead of writing rules at the mail client level. For example, if user A wants to see a reply to mail 3 only if it contains text "Urgent" and if someone tries to include user A in the reply to mail 3, there will be no warning message. However, after the e-mail is sent, it is filtered using the rules created by User A by the mail client.

Furthermore and in another example, if a user replies to an intermediary part of the mail thread, it will be inserted into the mail thread rather than continuing as a separate thread. Thus, the whole conversation (thread) is available to the users in the new e-mail thread, and management of e-mails in the e-mail thread becomes easier.

Furthermore and as described herein, a user can write rules on the threaded e-mail. This allows the user to manage the e-mail thread as he desires instead of writing rules at the e-mail client level, which applies rules to mails in the e-mail client (rather than just to the specific e-mail thread, as described herein). This allows the user to invoke finer granularity to rules, such that they apply only to certain threads, rather than all e-mails. Thus, the performance of the e-mail client and/or e-mail server is greatly improved, since the rules are only applied where intended (a specific thread), rather than to all e-mails for a particular user/client.

Furthermore and in another example, the present invention prevents branching out if someone replies to an intermediary mail. The option is left to the user to prevent the e-mail thread from being branched out (e.g., if it is confidential), or the user can insert the mail thread described herein if he/she wishes to be part the mail thread.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method of inserting a new e-mail into an interior of an original e-mail thread, the computer-implemented method comprising:
   receiving, by an e-mail server, a request to send a new e-mail to a new recipient, wherein the new e-mail is relevant to an interior e-mail in an original e-mail thread, wherein the original e-mail thread is an existing e-mail thread that has an unbranched single thread status, wherein the original e-mail thread comprises an initial e-mail and a latest e-mail, wherein the interior e-mail is chronologically between the initial e-mail and the latest e-mail in the original e-mail thread, and wherein the initial e-mail and the latest e-mail are addressed to prior recipients;
   retrieving, by the e-mail server, the original e-mail thread;
   inserting, by the e-mail server, the new e-mail into the original e-mail thread to create an updated e-mail thread, wherein the new e-mail is inserted next to the interior e-mail in the original e-mail thread, and wherein the updated e-mail thread retains the unbranched single thread status of the original e-mail thread;
   providing, by the e-mail server, the updated e-mail thread to the prior recipients, wherein the updated e-mail thread displays the new e-mail and an identity of the new recipient of the new e-mail;
   providing, by the e-mail server, all e-mails from the original e-mail thread and identities of the prior recipients to the new recipient; and
   receiving, by the e-mail server, a rules instruction from a user, wherein the rules instruction defines how to handle a future e-mail in the updated e-mail thread.

2. The computer-implemented method of claim 1, further comprising:
   blocking, by the e-mail server and according to the rules instruction from the user who sent rules and instruction and created rules found in the rules instruction, the user from receiving the future e-mail in the updated e-mail thread unless a predetermined recipient responds to a specific e-mail.

3. The computer-implemented method of claim 1, further comprising:
   blocking, by the e-mail server and according to the rules instruction from the user who sent rules and instruction and created rules found in the rules instruction, the user from receiving the future e-mail in the updated e-mail thread unless one or more of the prior recipients responds to the new e-mail.

4. The computer-implemented method of claim 1, further comprising:
   blocking, by the e-mail server and according to the rules instruction from the user who created the new e-mail, the new recipient of the new e-mail from receiving the future e-mail in the updated e-mail thread unless one or more of the prior recipients responds to the new e-mail.

5. The computer-implemented method of claim 1, further comprising:
   in response to the new recipient sending a response to an e-mail from the updated e-mail thread that violates the rules instruction, blocking, by the e-mail server, the response to the e-mail from the updated e-mail thread.

6. The computer-implemented method of claim 1, further comprising:
   transmitting, by the e-mail server, a notice of the rules instruction to the new recipient.

7. A computer program product for inserting a new e-mail into an interior of an original e-mail thread, the computer program product comprising a non-transitory computer readable storage medium having program code embodied therewith, the program code readable and executable by a processor to perform a method comprising:
   receiving a request to send a new e-mail to a new recipient, wherein the new e-mail is relevant to an interior e-mail in an original e-mail thread, wherein the original e-mail thread is an existing e-mail thread that has an unbranched single thread status, wherein the original e-mail thread comprises an initial e-mail and a latest e-mail, wherein the interior e-mail is chronologically between the initial e-mail and the latest e-mail in the original e-mail thread, and wherein the initial e-mail and the latest e-mail are addressed to prior recipients;
   retrieving the original e-mail thread;
   inserting the new e-mail into the original e-mail thread to create an updated e-mail thread, wherein the new e-mail is inserted next to the interior e-mail in the original e-mail thread, and wherein the updated e-mail thread retains the unbranched single thread status of the original e-mail thread;
   providing the updated e-mail thread to the prior recipients, wherein the updated e-mail thread displays the new e-mail and an identity of the new recipient of the new e-mail;
   providing all e-mails from the original e-mail thread and identities of the prior recipients to the new recipient; and
   receiving a rules instruction from a user, wherein the rules instruction defines how to handle a future e-mail in the updated e-mail thread.

8. The computer program product of claim 7, wherein the method further comprises:
   blocking, according to the rules instruction from the user who sent rules and instruction and created rules found in the rules instruction, the user from receiving the future e-mail in the updated e-mail thread unless a predetermined recipient responds to a specific e-mail.

9. The computer program product of claim 7, wherein the method further comprises:
blocking, according to the rules instruction from the user who sent rules and instruction and created rules found in the rules instructions, the user from receiving the future e-mail in the updated e-mail thread unless one or more of the prior recipients responds to the new e-mail.

10. The computer program product of claim 7, wherein the method further comprises:
blocking, according to the rules instruction from the user who created the new e-mail, the new recipient of the new e-mail from receiving the future e-mail in the updated e-mail thread unless one or more of the prior recipients responds to the new e-mail.

11. The computer program product of claim 7, wherein the method further comprises:
in response to the new recipient sending a response to an e-mail from the updated e-mail thread that violates the rules instruction, blocking the response to the e-mail from the updated e-mail thread.

12. The computer program product of claim 7, wherein the method further comprises:
transmitting, by the e-mail server, a notice of the rules instruction to the new recipient.

13. A computer system comprising:
a processor, a computer readable memory, and a non-transitory computer readable storage medium;
first program instructions to receive a request to send a new e-mail to a new recipient, wherein the new e-mail is relevant to an interior e-mail in an original e-mail thread, wherein the original e-mail thread is an existing e-mail thread that has an unbranched single thread status, wherein the original e-mail thread comprises an initial e-mail and a latest e-mail, wherein the interior e-mail is chronologically between the initial e-mail and the latest e-mail in the original e-mail thread, and wherein the initial e-mail and the latest e-mail are addressed to prior recipients;
retrieving the original e-mail thread;
second program instructions to insert the new e-mail into the original e-mail thread to create an updated e-mail thread, wherein the new e-mail is inserted next to the interior e-mail in the original e-mail thread, and wherein the updated e-mail thread retains the unbranched single thread status of the original e-mail thread;
third program instructions to provide the updated e-mail thread to the prior recipients, wherein the updated e-mail thread displays the new e-mail and an identity of the new recipient of the new e-mail;
fourth program instructions to provide all e-mails from the original e-mail thread and identities of the prior recipients to the new recipient; and
fifth program instructions to receive a rules instruction from a user, wherein the rules instruction defines how to handle a future e-mail in the updated e-mail thread; and wherein the first, second, third, fourth, and fifth program instructions are stored on the non-transitory computer readable storage medium for execution by one or more processors via the computer readable memory.

14. The computer system of claim 13, further comprising:
sixth program instructions to block, according to the rules instruction from the user who sent rules and instruction and created rules found in the rules instruction, the user from receiving the future e-mail in the updated e-mail thread unless a predetermined recipient responds to a specific e-mail; and wherein
the sixth program instructions are stored on the non-transitory computer readable storage medium for execution by one or more processors via the computer readable memory.

15. The computer system of claim 13, further comprising:
sixth program instructions to block, by the e-mail server and according to the rules instruction from the user who sent rules and instruction and created rules found in the rules instruction, the user from receiving the future e-mail in the updated e-mail thread unless one or more of the prior recipients responds to the new e-mail; and wherein
the sixth program instructions are stored on the non-transitory computer readable storage medium for execution by one or more processors via the computer readable memory.

16. The computer system of claim 13, further comprising:
sixth program instructions to block, according to the rules instruction from the user who created the new e-mail, the new recipient of the new e-mail from receiving the future e-mail in the updated e-mail thread unless one or more of the prior recipients responds to the new e-mail; and wherein
the sixth program instructions are stored on the non-transitory computer readable storage medium for execution by one or more processors via the computer readable memory.

17. The computer system of claim 13, further comprising:
sixth program instructions to, in response to the new recipient sending a response to an e-mail from the updated e-mail thread that violates the rules instruction, block the response to the e-mail from the updated e-mail thread; and wherein
the sixth program instructions are stored on the non-transitory computer readable storage medium for execution by one or more processors via the computer readable memory.

* * * * *